US012619863B2

(12) United States Patent　　　　　(10) Patent No.:　US 12,619,863 B2
Huang et al.　　　　　　　　　　　　　(45) **Date of Patent:　\*May 5, 2026**

(54) DEEP NEURAL NETWORK BASED ON FLASH ANALOG FLASH COMPUTING ARRAY

(71) Applicant: Peking University, Bejing (CN)

(72) Inventors: Peng Huang, Beijing (CN); Guihai Yu, Beijing (CN); Jinfeng Kang, Beijing (CN); Yachen Xiang, Beijing (CN); Xiaoyan Liu, Beijing (CN); Lifeng Liu, Beijing (CN)

(73) Assignee: Peking University, Beijing (CN)

( \* ) Notice: Subject to any disclaimer, the term of this patent is extended or adjusted under 35 U.S.C. 154(b) by 960 days.

This patent is subject to a terminal disclaimer.

(21) Appl. No.: 17/597,223

(22) PCT Filed: Dec. 31, 2019

(86) PCT No.: PCT/CN2019/130476
§ 371 (c)(1),
(2) Date: Dec. 29, 2021

(87) PCT Pub. No.: WO2021/012624
PCT Pub. Date: Jan. 28, 2021

(65) Prior Publication Data
US 2022/0318612 A1　　Oct. 6, 2022

(30) Foreign Application Priority Data

Jul. 22, 2019　(CN) ......................... 201910664715.X

(51) Int. Cl.
G06N 3/065　　(2023.01)
G06N 3/048　　(2023.01)
(52) U.S. Cl.
CPC ............. G06N 3/065 (2023.01); G06N 3/048 (2023.01)

(58) Field of Classification Search
CPC ............................... G06N 3/065; G06N 3/048
See application file for complete search history.

(56) References Cited

U.S. PATENT DOCUMENTS 11,132,176 B2 \*　9/2021　Hung ................. G11C 16/0416
12,120,331 B2 \*　10/2024　Kang ................... H04N 19/127
(Continued)

FOREIGN PATENT DOCUMENTS

CN　　106843809 A　　6/2017
CN　　108805270　　　11/2018
(Continued)

OTHER PUBLICATIONS

Han et al. (A Novel Convolution Computing Paradigm Based on NOR Flash Array with High Computing Speed and Energy Efficiency, Jan. 2019, pp. 1692-1703) (Year: 2019).\*
(Continued)

*Primary Examiner* — George Giroux
(74) *Attorney, Agent, or Firm* — Knobbe, Martens, Olson & Bear, LLP

(57)　　　　　　　　ABSTRACT

A deep neural network based on analog FLASH computing array, includes a number of computing arrays, a number of subtractors, a number of activation circuit units and a number of integral-recognition circuit units. The computing array includes a number of computing units, a number of word lines, a number of bit lines and a number of source lines. Each of the computing units includes a FLASH cell. The gate electrodes of the FLASH cells in the same column are connected to the same word line. The source electrodes of the FLASH cells in the same column are connected to the same source line, and the drain electrodes of the FLASH cells in the same row are connected to the same bit line. Each of the subtractors includes a positive terminal, a negative terminal and an output terminal.

5 Claims, 3 Drawing Sheets

(56) References Cited

U.S. PATENT DOCUMENTS

| 2016/0048755 | A1* | 2/2016 | Freyman | G06F 17/11 |
| | | | | 365/185.05 |
| 2019/0205729 | A1 | 7/2019 | Tran et al. | |
| 2019/0213234 | A1 | 7/2019 | Bayat et al. | |
| 2020/0285954 | A1* | 9/2020 | Li | G06N 3/063 |

FOREIGN PATENT DOCUMENTS

| CN | 109359269 | | 2/2019 |
| CN | 109800876 | A | 5/2019 |
| CN | 110010176 | | 7/2019 |
| CN | 110533160 | | 12/2019 |

OTHER PUBLICATIONS

Du et al. (An Analog Neural Network Computing Engine using CMOS-Compatible Charge-Trap-Transistor (CTT), Aug. 2018, pp. 1-11) (Year: 2018).*
International Search Report issued in International Application No. PCT/CN2019/130476, mailed on Apr. 22, 2020.
Office Action issued in Chinese Application No. 201910664715.X, dated Jun. 8, 2022.
Xiang et al., "Analog Deep Neural Network Based on NOR Flash Computing Array for High Speed/Energy Efficiency Computation", IEEE, in 4 pages, 2019.

* cited by examiner

Analog quantity operation
(SL input, BL output)

DEEP NEURAL NETWORK BASED ON FLASH ANALOG FLASH COMPUTING ARRAY

TECHNICAL FIELD

The present disclosure relates to a field of semiconductor device and integrated circuit, in particular to a deep neural network based on analog FLASH computing array.

BACKGROUND

Deep neural network (DNN) has an excellent performance in speech recognition, image recognition, etc., so it is widely used in the construction of the modern artificial intelligence system. The development of deep neural network has put forward a stringent requirement on the energy efficiency and hardware consumption of data operations. For the conventional computing architecture, due to the data transmission bottleneck between the central processing unit (CPU) and the memory, the computing speed is greatly restricted meanwhile the energy consumption and hardware requirements are also very huge.

SUMMARY

According to an aspect of the present disclosure, a deep neural network based on analog FLASH computing array is provided, which includes: a plurality of computing arrays, a plurality of subtractors, a plurality of activation circuit units and a plurality of integral-recognition circuit units. The computing array includes a plurality of computing units, a plurality of word lines, a plurality of bit lines and a plurality of source lines. Each of the computing units includes a FLASH cell. The gate electrodes of FLASH cells in each column are connected to the same word line. The source electrodes of the FLASH cells in each column are connected to the same source line. The drain electrodes of the FLASH cells in each row are connected to the same bit line. Each of the subtractors includes a positive terminal, a negative terminal and an output terminal. The positive terminal and the negative terminal are respectively connected to two adjacent bit lines. The output terminal is connected to the input terminal of an activation circuit or an integral-recognition circuit.

The present disclosure provides a deep neural network based on analog FLASH computing array. The threshold voltage of a FLASH cell in the computing array is set according to the corresponding weight value in the deep neural network. The analog matrix-vector multiplication and other operations are performed using the computing array, so as to construct hidden layers such as a convolutional layer, a pooling layer and a fully connected layer in the deep neural network.

In order to make the above objectives, features and advantages of the present disclosure more apparent, preferred embodiments combined with accompanying drawings are described in detail below

BRIEF DESCRIPTION OF THE DRAWINGS

In order to more clearly illustrate the technical solutions in the embodiments of the present disclosure, the accompanying drawings required in the description of the embodiments are briefly introduced below. It should be understood that the following accompanying drawings only show some embodiments of the present disclosure, and therefore should not be considered as limiting the scope. For those skilled in the art, other related drawings may be obtained from these accompanying drawings without inventive effort.

DETAILED DESCRIPTION OF EMBODIMENTS

Figure 1:
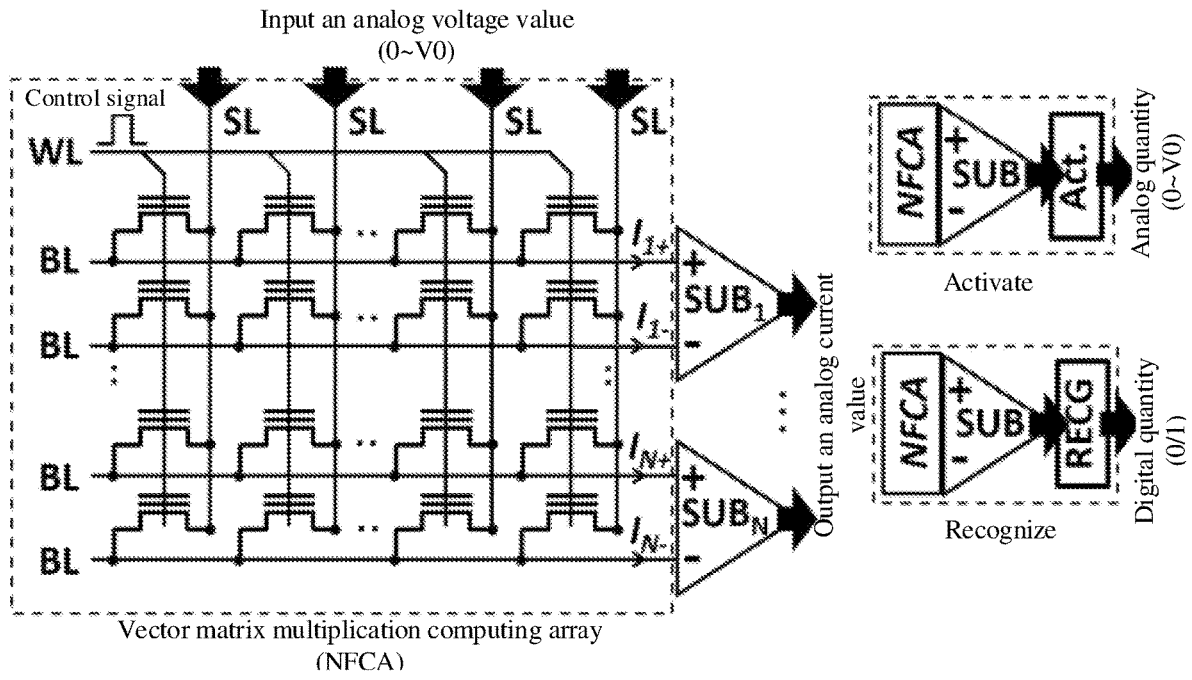
FIG. 1 illustrates a schematic diagram of implementing a deep neural network by using analog FLASH computing array.

The analog FLASH computing array may effectively perform the matrix-vector multiplication operations and accelerate the operation at hardware level for the deep neural network. The analog FLASH computing array may also greatly reduce the use of analog-to-digital or digital-to-analog conversion circuit (ADC or DAC) in peripheral circuit, which may greatly improve the utilization efficiency of energy and hardware resources. Therefore, the analog FLASH computing array has great significance to the hardware realization of artificial intelligence in the future.

The present disclosure provides a deep neural network based on analog FLASH computing array, which can mainly implement: (1) computing in memory; (2) achieving analog computations based on FLASH cells; and (3) implementing the deep neural network system based on the analog FLASH computing array.

The present disclosure provides a deep neural network based on analog FLASH computing array, in which the threshold voltage of a FLASH cell can be adjusted by programming/erasing. During the programming, hot electrons are injected into a floating gate, and the threshold voltage will rise. During the erasing, electrons tunnel away from the floating gate, and the threshold voltage will drop. When a bias is applied to FLASH cells with different threshold voltages (that is, in different states), different drain currents may be obtained. When a reasonable gate bias is applied to the FLASH cell and the drain-source voltage $V_{ds}$ is less than the specific value, the drain current $I_d$ of the FLASH cell and the drain-source voltage $V_{ds}$ may illustrate an approximately linear growth relationship. By using the reasonable method, the approximately linear growth relationship may be approximated to an ideal linear growth relationship and the error introduced may be minimized. The linear growth relationship of the FLASH cell may be used to represent the output results for the different analog input $V_{ds}$ with different linear states, so as to construct the analog FLASH in-memory computing array. The deep neural network system based on the analog FLASH computing array may effectively improve the energy efficiency of deep learning and significantly reduce the hardware overhead.

The deep neural network may include convolution layers, pooling layers, and fully connected layers. In essence, the matrix-vector multiplication operation occupies a large proportion in each layer. The analog FLASH computing array may efficiently perform the matrix-vector multiplication operation, so that the utilization efficiency of energy and hardware resources may be greatly improved. Before the operation starts, according to the values in the corresponding weight matrix, the threshold voltages of FLASH cells are set by preprograming. Then, the analog voltages representing the elements of the input vector are input into the corresponding source lines (SL) in the array. Due to a linear approximation of the $I_d$-$V_{ds}$ growth relationship, the $I_d$ may reflect the result of multiplying the input element by the weight value. On this basis, drain electrodes of a plurality of FLASH cells are connected together to the bit line (BL), and the sum currents on BLs may reflect the results of multiplying an input vector by the weight matrix stored in the FLASH computing array, so that the analog matrix-vector multiplication is achieved.

The technical solutions in the embodiments of the present disclosure will be clearly and completely described below with reference to the embodiments and the accompanying drawings in the embodiments. Obviously, the embodiments described are only a part but not all of the embodiments of the present disclosure. On the basis of the embodiments in the present disclosure, all other embodiments obtained by those skilled in the art without inventive efforts fall within the scope of protection of the present disclosure.

The NOR FLASH cell is taken as an example below to describe the deep neural network based on the analog FLASH computing array of the present disclosure, but the present disclosure is not limited to this. Those skilled in the art may understand that the deep neural network based on the analog FLASH computing array of the present disclosure is not limited to the NOR FLASH cell, and any type of FLASH cell is applicable to the deep neural network of the present disclosure.

The embodiments of the present disclosure provide a deep neural network (DNN) based on analog FLASH computing array. As shown in FIG. 1, the deep neural network based on the NFCA includes a plurality of computing units, a plurality of word lines, a plurality of source lines, a plurality of bit lines, a plurality of subtractors, activation circuit units and integral-recognition circuit units.

The computing array includes a plurality of computing units, and each of the computing unit includes a FLASH cell. Gate electrodes of FLASH cells in the same column are connected to the same word line (WL), source electrodes of the FLASH cells in the same column are connected to the same source line (SL), and drain electrodes of the FLASH cells in the same row are connected to the same bit line (BL).

The number of the word lines corresponds to the number of columns in the computing array, and the word line is used to apply a control signal to the gate electrodes of the FLASH cells, so as to control the FLASH cells to participate in an operation or not.

The number of the source lines corresponds to the number of the columns in the computing array, and the source lines are used to apply input signals to the source electrodes of the FLASH cells. The input signals are the analog voltages representing the element values of a DNN input vector. The analog voltage are arranged in a row and input to the source electrodes of the FLASH cells in each column through the corresponding source line.

The number of the bit lines corresponds to the number of rows in the computing array. The bit line is used to output the signals from the drain electrodes of the FLASH cells. Each row of bit lines superimposes the drain currents of the FLASH cells in this row, and outputs the superimposed drain currents as output signal. That is, the outputs of FLASH cells in the same row are connected to the same BL, and the total current on this BL is the sum of the outputs of FLASH cells in this row.

The number of the subtractors corresponds to half of the number of the rows in the computing array. Each of the substractors have a positive terminal, a negative terminal and an output terminal. The positive terminal and the negative terminal are respectively connected to two adjacent bit lines, and the output terminal may serve as an input terminal of the next operational layer in the deep neural network. The threshold voltage of the FLASH cell could not be a negative value and consequently could not directly represent a negative weight value. In the analog FLASH computing array, every two adjacent BLs are connected to one subtractor (SUB). The threshold voltages of the FLASH cells on the BL that is connected to the positive terminal of the subtractor represent positive weight values, and the threshold voltage on the BL that is connected to the negative terminal of the subtractor represent negative weight values. The current at the output terminal of the Nth subtractor represents the Nth element of the output vector. In this way, the analog FLASH computing array may achieve the matrix-vector multiplication operation in the DNN.

The threshold voltage of each FLASH cell represents the value of each element in the weight matrix, and may be set by pre-programming.

Figure 2:
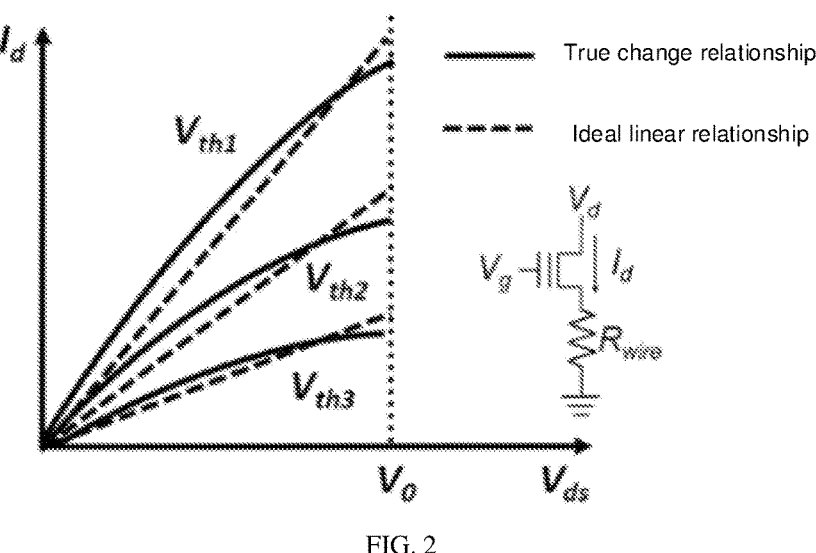
FIG. 2 illustrates a schematic diagram of the relationship between the voltage $V_{ds}$ and the drain current $I_d$ of the FLASH cell. $V_{ds}$ is the voltage applied between the source and drain electrodes of FLASH cell.

FIG. 2 illustrates a schematic diagram of the relationship between the voltage $V_{ds}$ and the drain current $I_d$ of the FLASH cell. $V_{ds}$ is the voltage applied between the source and drain electrodes of FLASH cell. When $V_{ds}$ is less than a specific value $V_0$, $I_d$ and $V_{ds}$ may illustrate an approximate linear growth relationship, and different threshold voltages may correspond to different ideal linear growth slopes. Denote that the value N represents the ideal linear state, and $\lambda \cdot N$ represents the slope of the ideal linear growth curve ($\lambda$ is a constant). The minimum nonlinear error may be introduced when an actual state under the threshold voltage $$V_{th} = V_{gs} - \left( \lambda \cdot N \cdot \frac{L}{\mu C_{ox} W} + \frac{V_0}{2\sqrt{2}} \right)$$

is regarded as the ideal N state (where $\mu$ represents the mobility of electron, $C_{ox}$ represents the equivalent capacitance of the gate oxide layer, L and W represent the length and width of the device channel, and these parameters can be regarded as constants). In addition, due to the robustness of deep neural network, by selecting a reasonable value of $V_0$, the influence of the error introduced by the linear approximation on the computation of FLASH array may be ignored. Therefore, it may be considered as reasonable that $I_d$ and $V_{ds}$ have a linear growth relationship in the range of 0 to $V_0$ and the growth rate is determined by the threshold voltage (that is, the corresponding state N) of the FLASH cell.

Figure 3:
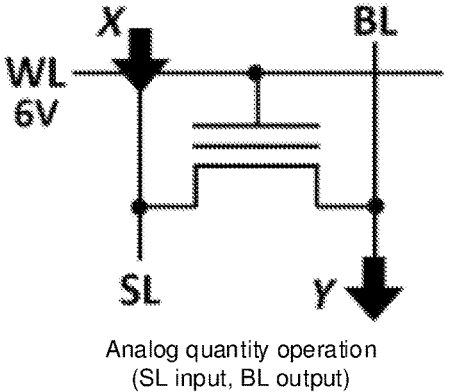
FIG. 3 illustrates a schematic diagram of the signal input and output of analog FLASH computing unit.

FIG. 3 illustrates a schematic diagram of the signal input and output of a FLASH cell. An analog voltage X ($X < V_0$) corresponding to an element of the input vector is input through the source line (SL), and the generated drain current Y is output through the bit line (BL). According to the linear growth relationship between $I_d$ and $V_{ds}$, it may be determined that the relationship between the output Y and the input X is $Y = \lambda \cdot N \cdot X = k \cdot X$. The k represents the weight coefficient that may be set by changing the threshold voltage of FLASH cell by pre-programming. Whether the FLASH cell operates or not can be controlled by the gate bias of the word line (WL). Therefore, the FLASH cell with input on SL, output on BL and control signal on WL may achieve the analog multiplication operation.

In the deep neural network based on the analog FLASH computing array shown in FIG. 1, the output signal of the subtractor may be input to a recognition circuit such as the integral-recognition circuit or to an activation circuit, so that the recognition result or activation signal of a layer in the DNN may be obtained. The recognition result or activation signal may be then used as the input vector of the next layer, so that a basic operation structure of the DNN may be achieved.

Figure 4:
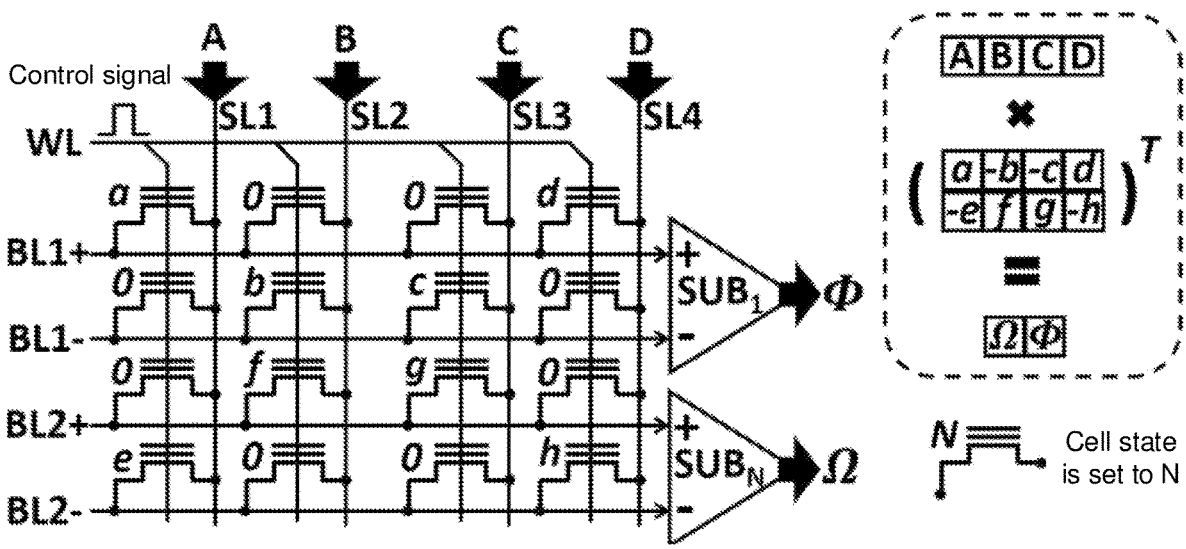
FIG. 4 illustrates a schematic diagram of achieving an example matrix-vector multiplication operation by using analog FLASH computing array.

FIG. 4 illustrates an example schematic diagram of implementing a matrix-vector multiplication operation by using analog FLASH computing array. An input vector is (A B C D), the elements of weight matrix include a, −b, −c, d, −e, f, h and −g, which are set to the respective positions in the computing array. The two subtractors output the final operation result (ΦΩ).

Figure 5:
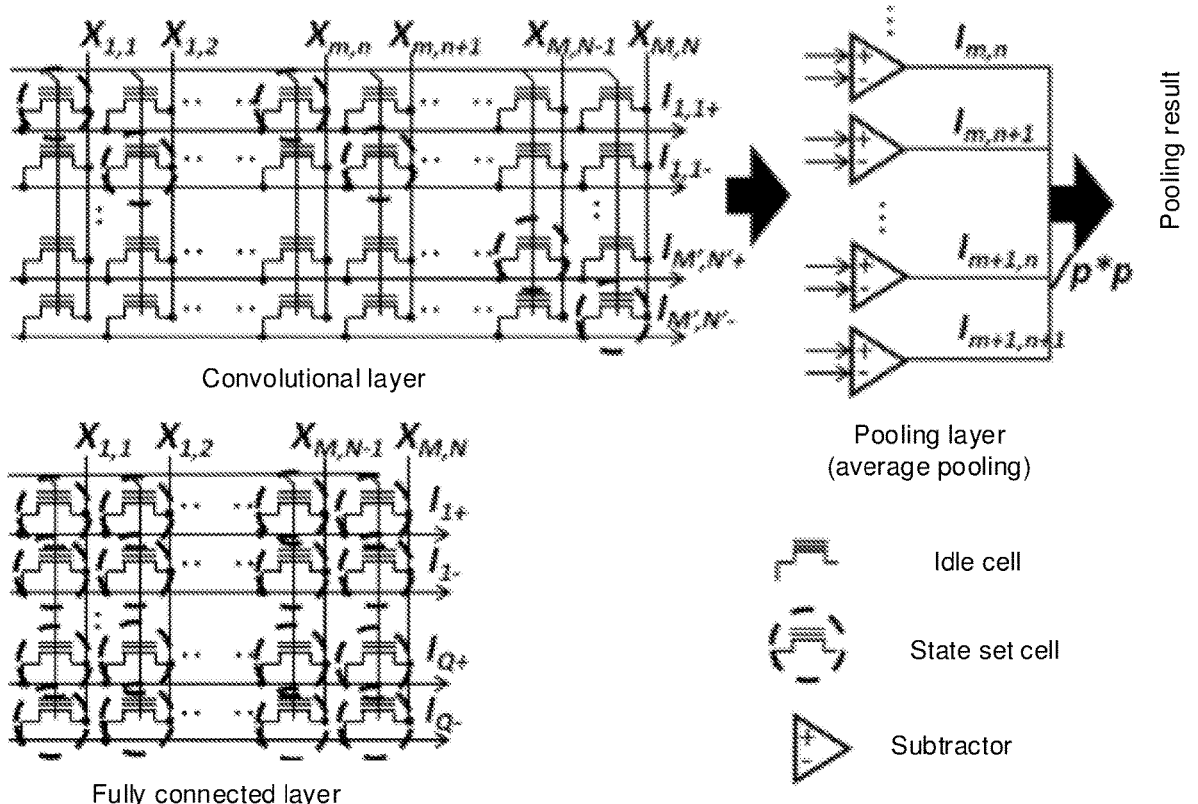
FIG. 5 illustrates a schematic diagram of implementing a convolutional layer, a pooling layer and a fully connected layer by using analog FLASH computing array.

FIG. 5 illustrates a schematic diagram of implementing a convolutional layer, a pooling layer and a fully connected layer by using analog FLASH computing array. The convolutional layer is implemented by setting idle FLASH cells. On the two bit lines (BL) connected to each subtractor, only k*k FLASH cells needs to set the threshold voltage state corresponding to the size of a convolution kernel. The shift operation of the convolution kernel is realized by the relative shift of the threshold voltage arrangement in every two BLs. The convolution operation has the same basis as the matrix-vector multiplication operation, which is multiplication and summation. Thus, they have the same basic principle. The elements of the input matrix are arranged in a row then input into the source lines (SL), and the output current on the bit line (BL) is a summation result. The difference is that the output result of each subtractor in the convolution layer is a convolution operation result obtained after each shift of the convolution kernel. An average pooling layer may achieve p*p average pooling by calculating an average of p*p current values output by the convolutional layer. The fully connected layer performs the typical matrix-vector multiplication operation, and the implementation method is the same as the principle in FIG. 1. Each weight value is set to the corresponding FLASH cell through pre-programming. The analog voltages corresponding to the input vector are input to the source lines (SL), then the output currents on the bit lines (BL) are the summation results. The subtractors output the final operation results.

The NOR FLASH cell is taken as an example above to describe the deep neural network based on the analog FLASH computing array of the present disclosure, but the present disclosure is not limited to this. Those skilled in the art may understand that the deep neural network based on the analog FLASH computing array of the present disclosure is not limited to the NOR FLASH cell, and any type of FLASH cell is applicable to the deep neural network of the present disclosure, that is, the FLASH cell in the technical solution of the present disclosure may include any type of FLASH cell. Further, the FLASH cell of the present disclosure may include a floating gate memory, a split gate memory, a charge trap memory (CTM), an embedded flash memory device or other flash memory devices with different device structures.

The above detailed description has explained a number of embodiments of the deep neural network based on the Analog FLASH computing array by using schematic diagrams, flowcharts and/or examples. In a case that the schematic diagrams, flowcharts and/or examples contain one or more functions and/or operations, those skilled in the art should understand that each function and/or operation in the schematic diagrams, flowcharts or examples may be implemented individually and/or jointly through various structures, hardware, software, firmware or substantially any combination thereof.

Unless there are technical obstacles or contradictions, the various embodiments of the present disclosure described above may be freely combined to form further embodiments, and these further embodiments are all within the scope of protection of the present disclosure.

Although the present disclosure is described with reference to the accompanying drawings, the embodiments disclosed in the accompanying drawings are intended to exemplarily illustrate the preferred embodiments of the present disclosure, and should not be understood as a limitation to the present disclosure. A size ratio in the accompanying drawings is only schematic and should not be construed as limiting the present disclosure.

Although some embodiments according to the general concept of the present disclosure have been illustrated and described, it should be understood by those of ordinary skilled in the art that these embodiments may be changed without departing from the principle and spirit of the general concept of the present disclosure. The scope of the present disclosure is defined by the claims and their equivalents.

What is claimed is:

1. A deep neural network based on analog FLASH computing array, comprising: a plurality of computing arrays, a plurality of subtractors, a plurality of activation circuit units and a plurality of integral-recognition circuit units; wherein each of the computing arrays comprises a plurality of computing units comprising a plurality of FLASH cells, a plurality of word lines, a plurality of bit lines and a plurality of source lines; each of the computing units comprises a FLASH cell, wherein each of the computing arrays comprises an array of rows and columns such that the plurality of FLASH cells are arranged in the rows and the columns, and gate electrodes of the FLASH cells in the same column are connected to the same word line, source electrodes of the FLASH cells in the same column are connected to the same source line, and drain electrodes of the FLASH cells in the same row are connected to the same bit line; each of the subtractors comprises a positive terminal, a negative terminal and an output terminal, the positive terminal and the negative terminal are respectively connected to two adjacent bit lines, and the output terminal is connected to an input terminal of an activation circuit or an integral-recognition circuit, wherein the number of the word lines corresponds to the number of columns in the computing array, and the word lines are configured to apply control signals to the gate electrodes of the FLASH cells, so as to control the FLASH cells to participate in an operation or not, wherein the number of the source lines corresponds to the number of columns in the computing array, and the source lines are configured to apply input signals to the source electrodes of the FLASH cells, the input signals are the analog voltages representing element values of DNN input vectors, the analog voltages are arranged in a row and input to the source electrodes of the FLASH cells in each column through the corresponding source lines, wherein the number of the bit lines corresponds to the number of rows in the computing array, the bit lines are configured to output the signals of the drain electrodes of the FLASH cells, and each of the bit lines is configured to superimpose the drain signal of the FLASH cells in one row and to output the superimposed drain signal as an output signal, wherein the plurality of computing arrays forms convolutional layers, wherein threshold voltages of the FLASH cells in the convolutional layers represent elements in a weight matrix, which are set by pre-programming, wherein the convolutional layers are implemented by setting idle FLASH cells to a threshold voltage state by setting only k*k FLASH cells corresponding to a size of a convolution kernel on the two bit lines connected to each of the plurality of subtractors, and a shift operation of the convolution kernel is implemented by a relative shift of the threshold voltage arrangement between the two bit lines connected to each of the plurality of subtractors in a respective computing array.

2. The deep neural network of claim 1, wherein the plurality of computing array forms fully connected layers, threshold voltages of the FLASH cells represent elements in a weight matrix and are set by pre-programming.

3. The deep neural network of claim 1, further comprising integral-recognition circuits and activation circuits, wherein the output terminal of each of the subtractors is connected to the integral-recognition circuit or the activation circuit.

4. The deep neural network of claim 1, further comprising pooling layers, which achieve pooling functions by connecting the output terminals of the subtractors together.

5. The deep neural network of claim 1, wherein the FLASH cell comprises a floating gate memory, a split gate memory, a charge trap memory, or an embedded flash memory device.

* * * * *